United States Patent [19]

Kawaguchi et al.

[11] Patent Number: 4,597,307
[45] Date of Patent: Jul. 1, 1986

[54] FOOT-OPERATED CONTROL DEVICE FOR PARKING BRAKE

[75] Inventors: Hiroshi Kawaguchi, Mishima; Shuho Nishina, Susono; Nobuyasu Nakanishi, Toyota; Yukio Honda, Kariya, all of Japan

[73] Assignee: Toyota Jidosha Kabushiki Kaisha, Toyota, Japan

[21] Appl. No.: 448,629

[22] Filed: Dec. 10, 1982

[30] Foreign Application Priority Data

Dec. 16, 1981 [JP] Japan ............................ 56-203229

[51] Int. Cl.⁴ .............................................. G05G 1/14
[52] U.S. Cl. ...................................... 74/512; 74/529; 74/539; 74/540
[58] Field of Search ............... 74/512, 527, 529, 539, 74/540, 534, 526, 542; 267/154, 155

[56] References Cited

U.S. PATENT DOCUMENTS

| 3,003,365 | 10/1961 | McKenzie | 74/529 |
| 3,109,320 | 11/1963 | Krautwurst | 74/529 |
| 3,861,237 | 1/1975 | Mounts . | |
| 3,929,033 | 12/1975 | Marx | 74/512 |
| 3,974,713 | 8/1976 | Toohey | 74/512 |
| 4,385,529 | 5/1983 | Ejiri et al. | 74/539 |
| 4,441,380 | 4/1984 | Kawaguchi et al. | 74/512 |

FOREIGN PATENT DOCUMENTS

| 55-146363 | 10/1980 | Japan | 74/512 |
| 815056 | 6/1959 | United Kingdom | 74/529 |
| 2041471 | 9/1980 | United Kingdom | 74/512 |
| 2059022 | 4/1981 | United Kingdom | 74/539 |

Primary Examiner—Kenneth J. Dorner
Assistant Examiner—Vinh Luong

[57] ABSTRACT

A foot-operated device for controlling a parking brake wherein a parking brake pedal is locked in its operated position through engagement of a pawl member with ratchet teeth. The pawl member is pivotally connected to the brake pedal, and the ratchet teeth are formed on a bracket fixed to a vehicle frame. The parking brake is released when a pedal pad pivotally connected to the brake pedal is pivoted on the pedal and the pedal is depressed. The pedal pad has an extension arm protruding toward the pawl member which is biased by a spring device in a first direction to cause the pawl member to engage the ratchet teeth while the pedal pad is placed in its original position. The extension arm directly engages the spring device to change the biasing direction thereof from the first direction to a second direction so that the pawl disengages from the ratchet teeth when the pedal pad is pivoted to its operated position. The biasing force in the second direction is selected to be smaller than an engagement force existing between the pawl member and the ratchet teeth.

8 Claims, 4 Drawing Figures

FOOT-OPERATED CONTROL DEVICE FOR PARKING BRAKE

BACKGROUND OF THE INVENTION

The present invention generally relates to a foot-operated control device for a parking brake of a vehicle, and more particularly to a control device which is manipulated solely by foot by the vehicle operator to release the parking brake being applied to the vehicle.

In the art of a foot-operated control device for a parking brake wherein a parking brake pedal is depressed by foot to apply the parking brake, the operation by the operator to release the applied parking brake has been conducted by hand. Such conventional control device suffers various problems such as: difficult manipulation for releasing the brake due to the operator's need for leaning forward while pulling a seat belt; generation of considerable sounds of impact of the brake pedal at the end of the quick return to its non-operated position upon releasing the brake; and difficult starting of a vehicle parked on a slope.

To overcome the above problems, there has been proposed a device as disclosed in JITSU-KAI-SHO 55-146363, publication of Japanese Utility Model application for public inspection, the disclosure of which is hereby incorporated by reference, wherein a parking brake is released by pivoting by foot a pedal pad pivotally connected to a parking brake pedal. To connect the pedal pad to a pawl member which is pivotally connected to the brake pedal and held in engagement with ratchet teeth by a first spring member, the disclosed device employs a linking mechanism which comprises an intermediate lever and a transmission rod which is connected at one end to the intermediate lever and at the other end to the pedal pad, so that a pivotal motion of the pedal pad in one direction by foot depression thereof is converted into a linear vertical motion of the transmission rod which in turn is changed into a pivotal motion of the intermediate lever which then causes a second spring member between the lever and the pawl member to be flexed, whereby the pawl member is biased by the second spring member in a direction opposite to the biasing direction of the first spring member, i.e., in the direction that causes the pawl member to disengage from the ratchet teeth. A pivotal movement of the brake pedal by applying a further depression onto the pedal pad in this condition will result in removal of an engagement force which has existed between the pawl member and the ratchet teeth, thereby permitting disengagement of the pawl member from the ratchet teeth.

However, the above foot-operated control device known in the art which uses the transmission rod and the intermediate lever is not satisfactory in view of its complicated linking mechanism and the consequent increase in the cost of manufacture.

SUMMARY OF THE INVENTION

It is accordingly an object of this invention to provide a foot-operated control device constructed as simply as possible for a parking brake, wherein both application and release of the parking brake are conducted by foot.

Another object of the invention is to provide such control device wherein both of an intermediate lever and a transmission rod as employed in the previously indicated device known in the art are eliminated.

To attain the above objects, a control device according to the present invention comprises:

a bracket fixed to a frame of a vehicle;

a parking brake pedal supported at a transversely middle portion thereof by the bracket pivotally about a first axis, and having one end portion to which a brake cable is connected;

a pedal pad connected to the other end portion of the brake pedal pivotally about a second axis parallel to the first axis, the pedal pad being pivoted between its original position and its operated position;

ratchet teeth disposed on the bracket along a circular arc which has a center located at the first axis;

a pawl member connected to the brake pedal pivotally about a third axis parallel to the first axis, and having a pawl engageable with the ratchet teeth;

an extension arm protruding from the pedal pad toward the pawl member; and spring means, associated with the pawl member and the extension arm, for biasing the pawl member in a first direction to cause the pawl to engage the ratchet teeth while the pedal pad is placed at the original position, and for biasing the pawl member in a second direction to cause the pawl to disengage from the ratchet teeth while the pedal pad is placed in the operated position, the direction of biasing the pawl member by the spring means being changed from the first direction to the second direction through an action of the extension arm incident to pivotal movement of the pedal pad from the original position to the operated position, a biasing force of the spring means in the second direction being smaller than an engagement force existing between the pawl member and the ratchet teeth in engagement with the pawl member.

In the control device constructed as described above, neither a transmission rod nor an intermediate lever is used to change, through pivotal movements of the pedal pad, the direction in which the pawl member is biased. This elimination of the transmission rod and lever of the prior art device described above will result in simplification of the overall structure of the control device, reduced time and labor for the manufacture and assembling thereof, and increased operating stability thereof. In addition, the present control device offers a solution to all of the previously discussed problems experienced in the art. That is, the device according to the invention wherein the parking brake is released solely by foot operation: will not require the operator to lean forward in releasing the parking brake; will not generate undesired sounds of impacts; provides for an easy starting of the vehicle parked on a slope; and prevents otherwise possible inadvertent or unintentional release of the brake thanks to two-step pivoting and depressing operations required to release the brake.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENTS

The present invention will be described in detail with reference to the accompanying drawings which illustrate preferred embodiments of a control device constructed according to the invention.

Figure 1:
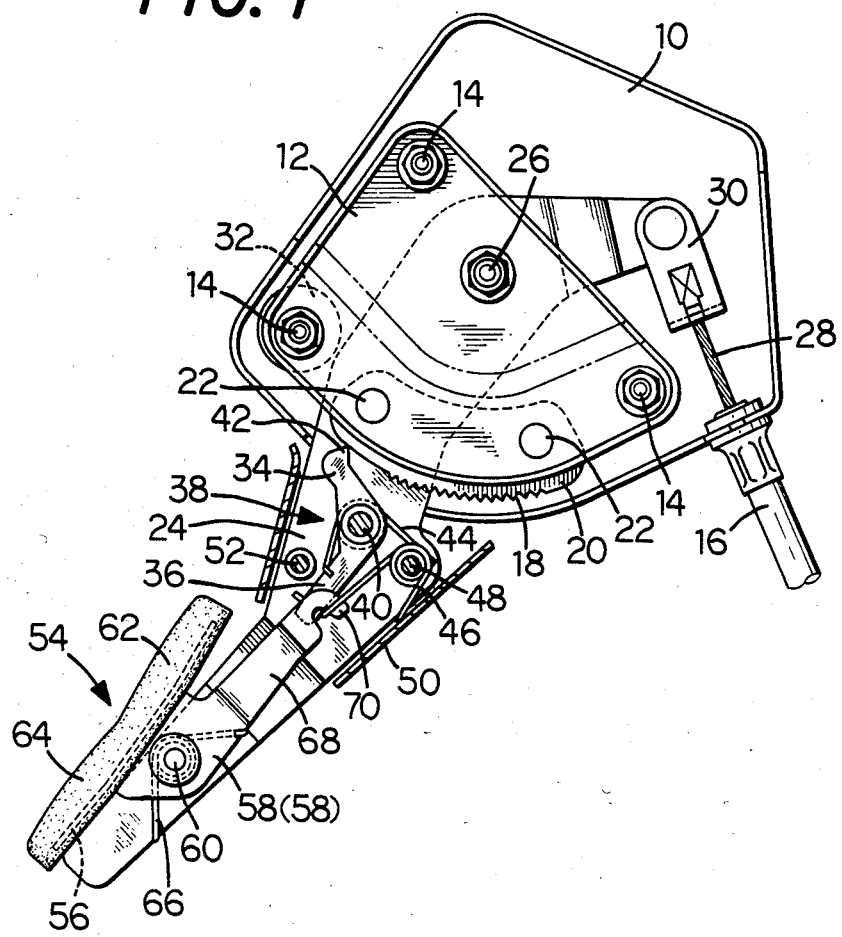
FIG. 1 is a side elevation, partly in cross section, of an embodiment of a foot-operated control device for a parking brake of the invention.
Figure 2:
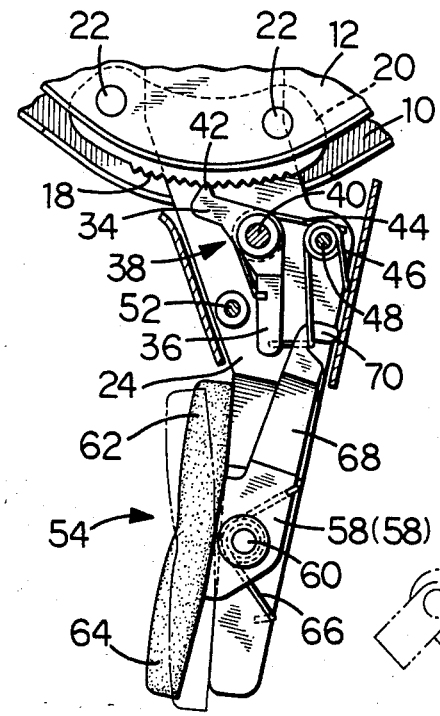
FIG. 2 is a side elevation, partly in cross section, of the control device of FIG. 1 when placed in its operated position.

Referring to FIGS. 1 and 2, there is illustrated a control device for a parking brake in one form of the present invention wherein brackets 10 and 12 which are fixed to a frame of a vehicle are fastened to each other by fasteners such as bolts 14 in spaced-apart and facing relation. One of the brackets 10 has, at its outer periphery, a flange to which is secured one end of an outer casing 16 of a brake cable 28 connected to the parking brake. The other bracket 12 is provided, at its lower inside surface, with a sector 20 which is fixed to the bracket 12 by rivets 22. The sector 20 has ratchet teeth 18 formed along a circular arc periphery at the lower end thereof.

Between this pair of brackets 10, 12, there is interposed an upper end portion of a parking brake pedal 24 which is pivotally connected to the brackets 10, 12 by a bolt 26 located transversely in a middle portion of the pedal. One end of the brake cable 28 is connected to the upper end of the brake pedal 24 so that the cable is pulled when the pedal 24 is pivoted counterclockwise as viewed in FIG. 1 to its operated position. The brake pedal 24 is blocked by a stop 32 fixed to the brackets 10, 12 such that the stop 32 determines the non-operated or original position of the pedal 24.

To a part of the brake pedal 24 located below the ratchet teeth 18, is pivotally connected a pawl member 38 of bell-crank configuration which includes a first arm 34 and a second arm 36. The pawl member 38 is pivotal about an axis or shaft 40 which is parallel to the connecting bolt 26 which serves as a pivot fulcrum or axis of the brake pedal 24. The first arm 34 has at its free end a pawl 42 protruding toward the sector 20 so that the pawl 42 is engageable with the ratchet teeth 18. The pawl member 38 is biased by a torsion spring 44 (first spring) and a torsion spring 46 (second spring), one end portion thereof being kept in engagement with the second arm 36 such that the torsion spring 44 urges the pawl member 38 in a direction to cause the pawl 42 to disengage from the sector 20 and such that the torsion spring 46 urges the pawl 42 in another direction to cause the pawl 42 to engage the sector 20. A biasing force of the torsion spring 46 is selected to be greater than that of the torsion spring 44, whereby the pawl member 38 is normally held in engagement with or forced against the sector 20. The torsion spring 46 has a central coil portion wound about a pin 48 fixed to the brake pedal 24, and the above indicated one end portion thereof engaging the second arm 36 is bent toward the surface of the brake pedal 24 to form a bent end which abuts on one side surface of the second arm 36 at its free end. The other end portion of the torsion spring 46 is held in abutment on the inner surface of a covering 50 which is secured to the brake pedal 24 by a fixing pin 52, shaft 40 and pin 48. The covering 50 protects the pawl member 38, torsion springs 44 and 46, and other parts from foreign matters. The other torsion spring 44 has a central coil portion wound about the periphery of a boss formed on the pawl member 38, and the above indicated one end portion of the spring 44 engaging the second arm 36 is bent away from the surface of the brake pedal 24 to form a bent end which abuts on the other side surface of the second arm 36 at its middle portion. The other end portion of the torsion spring 44 is held in abutment on the periphery of the pin 48.

A pedal pad 54 is connected to a lower end portion of the brake pedal 24. The pedal pad 54 includes a base plate 56 and a pair of mounting legs 58 extending from the bottom of the base plate 56. The mounting legs 58 are connected to the brake pedal 24 with a shaft 60 so that the pedal pad 54 is pivotable over a given angle relative to the brake pedal 24. The pedal pad 54 further includes a generally planar portion which extends longitudinally of the brake pedal 24 and consists of an upper half section 62 and a lower half section 64. The upper half section 62 is inclined at a slight angle with respect to the lower half section 64 in a direction away from the brake pedal 24. In other words, the generally planar portion of the pedal 24 is bent at its middle portion such that the upper and lower sections 62, 64 form, on the depressed side of the planar portion, a shallow vee-groove running in parallel to the shaft 60. The pedal pad 24 is pivoted clockwise as seen in FIG. 1 when the upper section 62 is depressed. The pedal pad 54 is biased counterclockwise by a torsion spring 66 whose both ends engage the pedal 24 and the mounting legs 58 such that the bottom surface of the lower section 64 is normally held in abutment on the surface of the brake pedal 24. This position is referred to as original position of the pedal pad 54.

An extension arm 68 extends from one of the mounting legs 58 along the length of the brake pedal 24 toward the second arm 36 of the pawl member 38. At the free end of the extension arm 68, which normally overlies the free end of the second arm 36, there is formed a hook 70 which is normally located in proximity to said bent end of the torsion spring 46 so that the hook 70 is able to instantaneously engage the bent end when the pedal pad is started to pivot clockwise.

When a parking brake is applied through the control device constructed as described above, the pedal pad 54 is depressed at its lower section 64, and the brake pedal 24 is consequently pivoted counterclockwise about the fulcrum bolt 26. As the pedal 24 is pivoted, the pawl member 38 is moved. More specifically stated, the pawl 42, which is forced against the arcuate end of the sector 20 by the torsion spring 46, is brought into contact with the first tooth of the ratchet teeth 18 when the brake pedal 24 has been pivoted through a certain angle. A further movement of the pedal 24 will cause the pawl 42 to move on the ratchet teeth 18 while climbing over each tooth of the ratchet. Although the bent end of the torsion spring 46 engaging the second arm is pushed back or pivoted counterclockwise an extremely small angle each time the pawl 42 climbs over the crest of the tooth 18, the resulting oscillation of the bent end of the torsion spring 46 will be absorbed by a slight clearance existing between the hooked end of the extension arm 68 and the bent end of the torsion spring 46, whereby the oscillation will not be transmitted to the pedal pad 54.

When the depression force applied to the pedal pad 54 is removed after a given angle of pivoting movement of the brake pedal 24, the pawl 42 of the pawl member 38 will engage an appropriate tooth of the ratchet teeth 18 as shown in FIG. 2, whereby the brake pedal 24 is locked in its operated position at which the brake cable 28 connected to the upper end of the pedal 24 is pulled a certain length and given a corresponding tightness.

When the applied parking brake is released, the upper section 62 is first depressed to pivot the pedal pad 54 clockwise to its operated position shown in solid line in FIG. 2, i.e., until the bottom surface of the upper section 62 comes into abutment with the brake pedal 24. As the pedal pad 54 is pivoted, the extension arm 68 is pivoted in the same direction and its hook 70 is brought into engagement with the bent end of the torsion spring 46, thereby pivoting the bent end counterclockwise. As a result, the bent end of the spring 46 disengages from the free end of the second arm 36 of the pawl member 38 and the biasing force of the spring 46 is removed from the pawl member 38, whereby only the biasing force of the torsion spring 44 is applied to the pawl member 38. While the torsion spring 44 urges the pawl member 38 in the direction that causes the pawl 42 to disengage from the sector 20 as previously described, the spring 44 will not separate the pawl member from the ratchet teeth 18 because the biasing force of the spring 44 is selected to be smaller than an engagement force existing between the pawl 42 and the ratchet teeth 18 due to a tensile force of the brake cable 28 or a biasing force of a return spring (not shown) provided to restore the brake pedal 24 to its original position.

When the brake pedal 24 is further pivoted counterclockwise from the operated position in FIG. 2 by applying a further depression force onto the upper section 62 of the pedal pad 54, the above indicated engagement force between the pawl 42 and the ratchet teeth 18 is lost and the pawl member 38 is pivoted counterclockwise with the biasing force of the torsion spring 44. Thus, the pawl member 38 disengages from the ratchet teeth 18. When the operator's foot is withdrawn, the brake pedal 24 is returned to its original position by the tensile force of the brake cable 28 or by the above indicated return spring connected to the pedal. In the last stage of the pedal return, the extension arm 68 is returned by the biasing force of the torsion spring 66 and its hook 70 disengages from the bent end of the torsion spring 46, thereby allowing the bent end to engage the free end of the second arm 36 of the pawl member 38 and causing the pawl member 38 to return to its initial position at which the pawl 42 is again forced against the sector 20.

As described above, the control device of this invention permits both application and release of the parking brake by means of pivoting and depressing actions of the brake pedal 24 and the pedal pad 54, which can be accomplished by the vehicle operator, who is not required to change posture in applying or releasing the brake. The brake pedal 24 is slowly returned to its original non-operated position by a gradual withdrawal of the operator's foot from the depressed position. This feature eliminates possible generation of undesired impact sounds when the brake is released. The gradual release of the parking brake combined with an easy manipulation of the control device for releasing the brake, will facilitate starting the vehicle parked on a slope. Further, the applied parking brake will not be released inadvertently or unintentionally because a release of the parking brake requires two steps of operation by the operator, i.e., both pivotal movement of the pedal pad 54 and subsequent depression of the brake pedal 24.

While the control device disclosed in JITSU-KAI-SHO 55-146363, published Japanese Utility Model application, is manipulated by foot to apply and release a parking brake as previously stated, such device is not satisfactory in various aspects. To manifest the features of the control device of the invention, the following description of the present invention refers to FIG. 3 which shows the known control device shown in the above published application. In the figure, a linear motion of a rod 206 incident to a pivotal motion of a pedal pad 200 is converted into a pivotal motion of an intermediate lever 204 which causes a second spring 212 between the intermediate lever and a pawl member 202 to be flexed. A biasing force of this second spring 212 which acts to cause the pawl member 202 to disengage from a sector 210, is varied as the spring 212 is flexed. The pawl member 202 is also biased by a first spring but toward the sector 210. Consequently, the biasing force with which the pawl member 202 is actually urged in the direction away from ratchet teeth 211 is determined as a difference between the varying resilient force of the second spring 212 and the resilient force of the first spring 208. Thus, the control device shown in FIG. 3 employs a complicated motion linking mechanism.

In the control device according to the present invention, however, the pivoting motion of the pedal pad 54 is directly used to remove the biasing force of the torsion spring 46 from the pawl member 38, viz., to change the direction in which the pawl member 38 is biased, so that the member 38 is urged so as to disengage from the ratchet teeth 18. Thus, no transmission rod or intermediate lever is required, and the construction of the control device is considerably simplfied, which results in reduced time and labor for the manufacture and assembling of the device and in decreased accumulative errors during the manufacturing and assembling processes.

Figure 3:
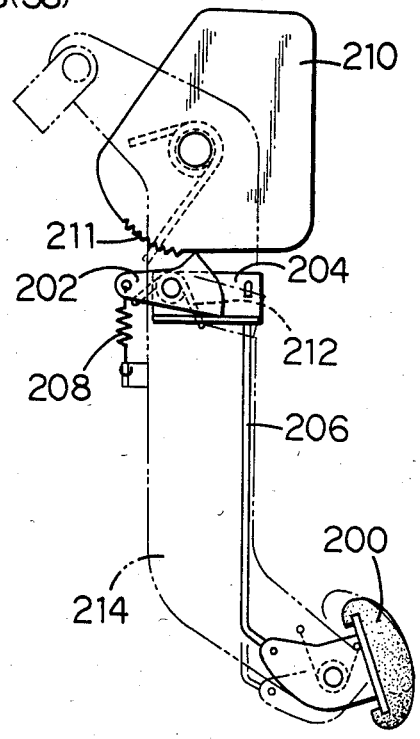
FIG. 3 is a side elevation of a foot-operated control device known in the art for a parking brake.

In the known device of FIG. 3, a difference in resilient force between the two springs 208 and 212 acts on the pawl member 202 as a force of actually biasing the pawl member 202 in the direction to cause it to disengage from the ratchet teeth 211 as discussed above. This fact means that the disengagement biasing force applied to the pawl member 202 is affected by cumulative variations in spring constant, mounting position, etc. of both springs 208 and 212. On the other hand, the force acting on the pawl member 38 of the present device at the end of the pivotal motion of the pedal pad 54 is determined exclusively by the resilient force of the torsion spring 44 which is not varied with a pivotal movement of the pedal pad 54; that is, the resilient force held constant irrespective of whether the pedal pad 54 is placed in its operated position or in its non-operated position. Consequently, the disengagement biasing force acting on the pawl member 38 is easily set at an optimum level, whereby the pawl member 38 is less likely to be affected by variation in the resilient force of the spring 34 and can be stably operated.

The known device shown in FIG. 3 is further disadvantageous in that its pedal pad 200 which has a comparatively short vertical length like an ordinary pedal pad, requires the operator to conduct a troublesome and difficult manipulation thereof by foot when the pad 200 is pivoted counterclockwise as seen in the figure, viz., the operator's foot must be lifted while in contact with the surface of the pedal pad as it is pivoted. When the brake pedal 214 is pivoted clockwise by depressing by foot the pivoted pedal pad 200 in an obliquely downward direction, the pedal pad 200 may possibly be pivoted clockwise to its original position during the pivoting movement of the pedal 214. Thus, extra care should be taken when the brake pedal 214 is pivoted to release the parking brake. In the device of the present invention, to the contrary, the pedal pad 54 is a vertically extending comparatively long member including the lower section 64 which is depressed to apply the brake, and the upper section 62 which is depressed to release the brake. The depression by foot of the upper section 62 will first pivot the pad 54 and then pivot the pedal 24, allowing the brake to be easily released without the possibility of the pad 54 being pivoted back to its original position.

Figure 4:
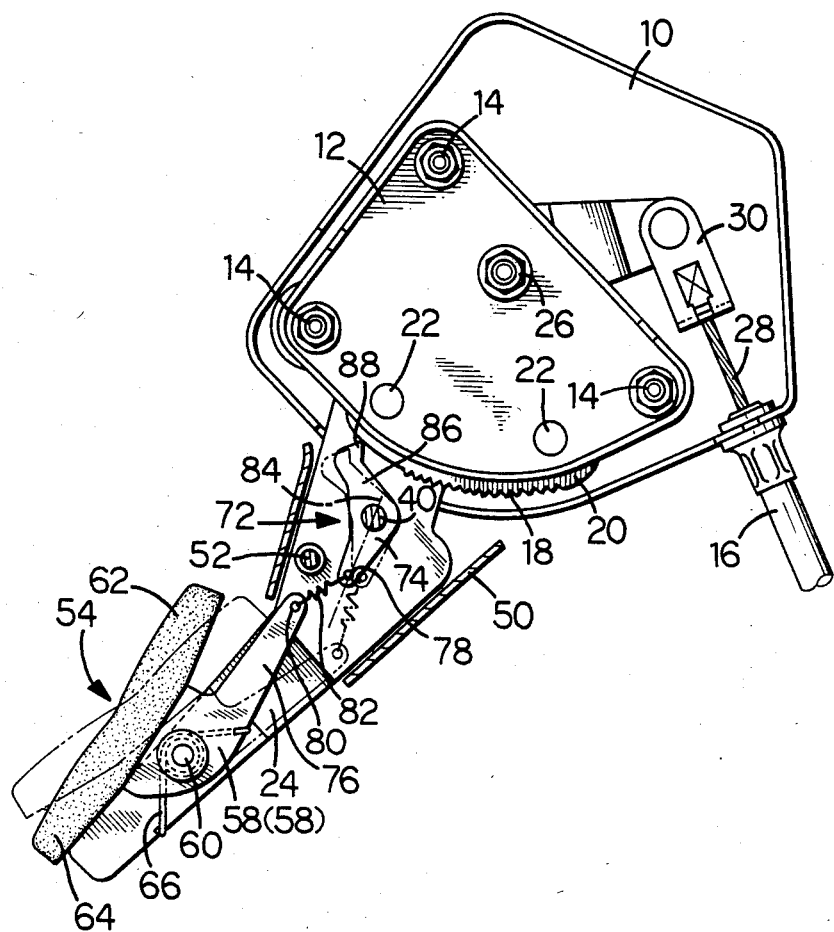
FIG. 4 is a side elevation, partly in cross section, of another embodiment of the control device of the invention.

Referring to FIG. 4, there is illustrated a modified embodiment of the present control device wherein a second arm 74 of a pawl member 72 and an extension arm 76 of the pedal pad 54 have engagement holes 78, 80 respectively at the free ends thereof which are connected by a coil spring 82 whose opposite ends engage the engagement holes 78 and 80. The extension arm 76 is so adapted that the free end thereof or the engagement hole 80 is located to the left of a straight line 84 passing the pivoting fulcrum of the pawl member 72 (center of the shaft 40) and the center of the engagement hole 78 of the second arm 74, while the pedal pad is held in its original non-operated position by the torsion spring 66, and to the right of the straight line 84, when the pedal pad 54 is pivoted to its operated position. The structural description of other parts are omitted herein as they are identical to corresponding parts in the preceding embodiment and are designated by the same reference characters.

In the above modified embodiment, a pawl 88 of the pawl member 72 is kept forced against the arcuate end of the sector 20 while the pedal pad 54 is held in its original position by the biasing force of the torsion spring 66. When the brake pedal 24 is pivoted counterclockwise, the pawl 88 moves on the arcuate end of the sector 20 and engages an appropriate tooth of the ratchet 18 when the pivotal movement of the pedal 24 is ended at its operated position, as discussed in association with the previous embodiment.

When the upper section 62 is depressed to pivot the pedal pad 54 clockwise, the coil spring 82 is pivoted to the right of the straight line 84, and the direction of its biasing force is changed so that the spring 82 urges the pawl member 72 in the direction that causes the pawl 88 to disengage from the ratchet teeth 18. When the brake pedal 24 is further depressed in this condition to remove the engagement force which has existed between the pawl 88 and the teeth 18, the pawl member 72 is pivoted counterclockwise by the biasing force of the coil spring 82, whereby the pawl 88 is separated from the ratchet teeth 18. The applied parking brake is released when the brake pedal 24 is subsequently returned to its non-operated position.

Thus, in this modified embodiment, only one spring is used to urge the pawl member 72 against the sector 20 as well as to separate the same member from the sector 20 through pivotal movements of the pedal pad 54.

What is claimed is:

1. A foot-operated device for controlling a parking brake of a vehicle, comprising:
   bracket means adapted to be fixed to a frame of the vehicle;
   a parking brake pedal supported at a transversely middle portion thereof by said bracket means pivotally about a first axis, and having one end portion to which a brake cable is connected;
   a pedal pad connected to the other end portion of said brake pedal pivotally about a second axis parallel to said first axis, said pedal pad being pivoted between its orginal position and its operated position;
   ratchet teeth disposed on said bracket means along a circular arc which has a center located at said first axis;
   a pawl member connected to said brake pedal pivotally about a third axis parallel to said first axis, and having a pawl engageable with said ratchet teeth;
   an extension arm protruding from said pedal pad toward said pawl member; and
   spring means, directly engageable with said pawl member and said extension arm, for biasing said pawl member in a first direction to urge said pawl to engage said ratchet teeth while said pedal pad is placed at said original position, and for biasing said pawl member in a second direction to urge said pawl to disengage from said ratchet teeth while said pedal pad is placed in said operated position, the direction of biasing said pawl member by said spring means being changed from said first direction to said second direction through an action of said extension arm incident to pivotal movement of said pedal pad from said original position to said operated position, a biasing force of said spring means in said second direction being smaller than an engagement force existing between said pawl member and said ratchet teeth in engagement with said pawl member.

2. A device as recited in claim 1, which further comprises a covering secured to said brake pedal and protecting said pawl member and said spring means.

3. A device as recited in claim 1, which further comprises a torsion spring biasing said pedal pad toward said original position, said torsion spring having a central coil portion wound about said second axis, one arm engaging said brake pedal and the other arm engaging said pedal pad.

4. A device as recited in claim 1, wherein said pedal pad comprises a generally planar member extending longitudinally of said brake pedal and pivotally supported at a longitudinally middle portion thereof by said brake pedal, said planar member including an upper section and a lower section which are inclined with respect to each other so as to form on the depressed side of said planar member a shallow vee-groove running in parallel to said second axis.

5. A foot-operated device for controlling a parking brake of a vehicle, comprising:
   bracket means adapted to be fixed to a frame of the vehicle;
   a parking brake pedal supported at a transversely middle portion thereof by said bracket means pivotally about a first axis, and having one end portion to which a brake cable is connected;
   a pedal pad connected to the other end portion of said brake pedal pivotally about a second axis parallel to said first axis, said pedal pad being pivoted between its original position and its operated position;
   ratchet teeth disposed on said bracket means along a circular arc which has a center located at said first axis;
   a pawl member connected to said brake pedal pivotally about a third axis parallel to said first axis, and having a pawl engageable with said ratchet teeth;

an extension arm protruding from said pedal pad toward said pawl member; and spring means, associated with said pawl member and said extension arm, for biasing said pawl member in a first direction to urge said pawl to engage said ratchet teeth while said pedal pad is placed at said original position, and for biasing said pawl member in a second direction to urge said pawl to disengage from said ratchet teeth while said pedal pad is placed in said operated position, the direction of biasing said pawl member by said spring means being changed from said first direction to said second direction through an action of said extension arm incident to pivotal movement of said pedal pad from said original position to said operated position, a biasing force of said spring means in said second direction being smaller than an engagement force existing between said pawl member and said ratchet teeth in engagement with said pawl member, wherein said spring means comprises a first spring constantly biasing said pawl member in said second direction, and a second spring normally engaging said pawl member and biasing same in said first direction, a biasing force of said second spring being greater than that of said first spring, said second spring engaging said extension arm and disengaging from said pawl member when said pedal pad is pivoted to its operated position.

6. A device as recited in claim 5, wherein said pawl member includes an engagement arm a free end portion of which normally faces a free end portion of said extension arm in mutually spaced-apart relation in a direction parallel to said third axis, said second spring being engageable selectively with one of the free end portions of said engagement arm and said extension arm.

7. A device as recited in claim 6, wherein said second spring comprises a torsion spring having one arm fixed to said brake pedal and the other arm normally engaging the free end portion of said engagement arm, said other arm engaging the free end portion of said extension arm and disengaging from said engagement arm when said pedal pad is pivoted to said operated position.

8. A device as recited in claim 5, wherein said first spring comprises a torsion spring having a central coil portion wound about said third axis, one arm fixed to said brake pedal and the other arm engaging said pawl member.

* * * * *